US008643714B2

(12) United States Patent
Xiong et al.

(10) Patent No.: US 8,643,714 B2

(45) Date of Patent: Feb. 4, 2014

(54) TEST DEVICE AND METHOD FOR TESTING DISPLAY PARAMETERS

(75) Inventors: Yu-Kai Xiong, Shenzhen (CN); Xin Lu, Shenzhen (CN); Shih-Fang Wong, New Taipei (TW); Dong-sheng Lv, Shenzhen (CN); Xin-Hua Li, Shenzhen (CN); Yu-Yong Zhang, Shenzhen (CN); Jian-Jian Zhu, Shenzhen (CN)

(73) Assignees: Fu Tai Hua Industry (Shenzhen) Co. Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 327 days.

(21) Appl. No.: 13/271,150

(22) Filed: Oct. 11, 2011

(65) Prior Publication Data

US 2013/0016207 A1 Jan. 17, 2013

(30) Foreign Application Priority Data

Jul. 11, 2011 (CN) .......................... 2011 1 0192067

(51) Int. Cl.
*H04N 7/18* (2006.01)

(52) U.S. Cl.
USPC ................. 348/92; 348/86; 348/93; 348/180; 348/181; 348/184; 348/189; 348/190; 348/191; 382/209; 382/211; 382/212; 382/214; 382/217

(58) Field of Classification Search
USPC ............... 348/86, 92, 93, 180, 181, 184, 189, 348/190, 191; 382/209, 211, 212, 214, 217
See application file for complete search history.

(56) References Cited

U.S. PATENT DOCUMENTS

| | | | | |
|---|---|---|---|---|
| 2009/0040311 | A1* | 2/2009 | Okamoto et al. | 348/181 |
| 2010/0079596 | A1* | 4/2010 | Qiu et al. | 348/181 |
| 2011/0116719 | A1* | 5/2011 | Bilobrov | 382/217 |
| 2012/0229629 | A1* | 9/2012 | Blumstein-Koren et al. | 348/143 |

OTHER PUBLICATIONS

Yang et al. TW201010645A with Translated Abstract. Mar. 2010.*

* cited by examiner

*Primary Examiner* — Christopher S Kelley
*Assistant Examiner* — Zhihan Zhou
(74) *Attorney, Agent, or Firm* — Altis Law Group, Inc.

(57) ABSTRACT

A test device is for testing display parameters of an electronic product with a page browsing function. The electronic product stores display times of a number of standard frames which selected from a standard video file. The standard video file includes frames record the play process of a testing file being played by a standard electronic product. The test device controls a video capturing unit to capture an original video file which includes frames to records the playing process of the electronic product. The electronic product searches matching frames of the number of standard frames in the original video file. Thus the parameters of the electronic product can be determined by display times of the matching frames in the video file.

12 Claims, 3 Drawing Sheets

TEST DEVICE AND METHOD FOR TESTING DISPLAY PARAMETERS

BACKGROUND

1. Technical Field

The present disclosure relates to test devices for testing electronic products and, particularly, to a test device and a method for testing display parameters of the electronic product.

2. Description of Related Art

Before being shipped from the factory, the display parameters of electronic products with a page browsing function, such as an E-book device or a digital photo frame, need to be tested by a test device. Generally, the display parameters include a display response time and a page response time. Before testing, a to-be-tested product is placed in a fixed position in the front of the test device. When testing the display parameters, the test device sends a play instruction to the to-be-tested electronic product. The to-be-tested electronic product turns on a light to indicate the play instruction is received and play a testing file including a number of pages in response to the play instruction. The test device captures the play process of the testing file played by the to-be-tested electronic product to generate a video file. After obtaining the video file, a number of particular frames selected from the video file are used as key frames for testing. The key frames include a first key frame which displays a picture which is captured when the electronic product turns on the light, a second key frame which is a frame first obtained when the first page of the testing file is played, a third key frame which is a frame lastly obtained when a page of the testing file is played, a fourth key frame which is a frame first obtained when another page following the page of the testing file is played. The display time difference between the display time of the first key frame and the second key frame is defined as the display response time. The display time difference between the display time of third key frame and the fourth key frame is defined as the page response time. In general way, a frame of the video file which displays a picture with a turned on light is taken as the first key frame. The other key frames are obtained by comparing pixels value of two adjacent frames of the video file after the first key frame. The second frame is a frame which is first obtained when the pixel values of the frame are different from that of a previous frame after the first key frame. The third key frame is a frame whose pixel values are the same as that of the previous frame but different from that of the next frame after the second frame. The fourth key frame is a frame whose pixel values are different from that of a previous frame but the same as that of the next frame. However, this one by one frame comparison results in low efficiency.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The test device in the following embodiment is for testing display parameters of a to-be-tested electronic product with a page browsing function, such as an E-book device or a digital photo frame. The display parameters of the to-be-tested electronic product include a display response time and a page response time.

Figure 1:
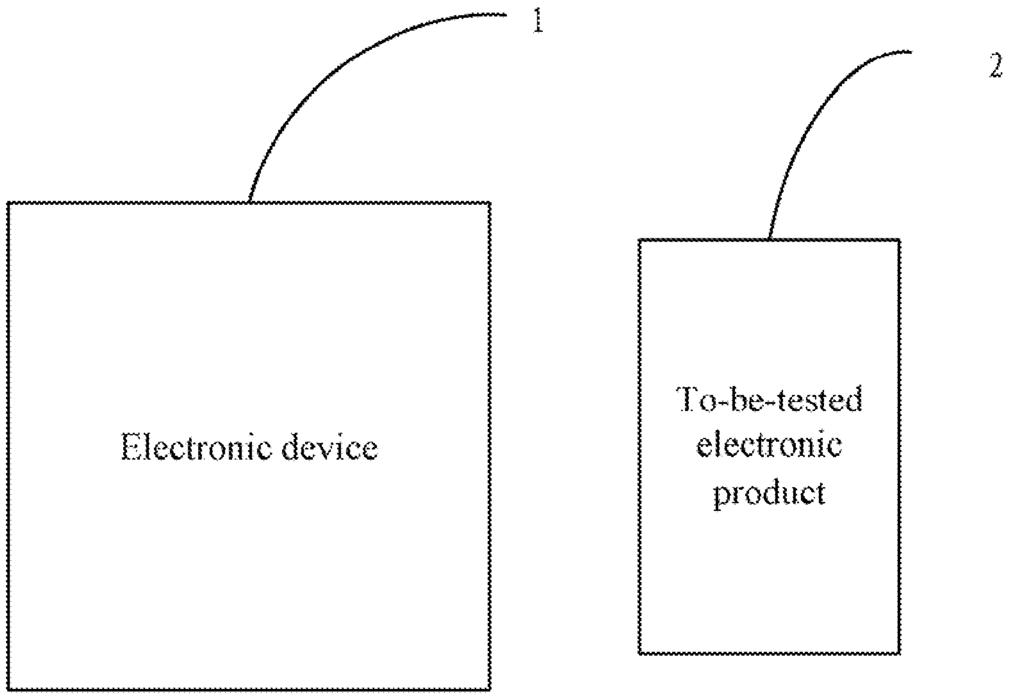
FIG. 1 is a schematic diagram of a test device to test a to-be-tested electronic product, in accordance with an exemplary embodiment.

FIG. 1 is a schematic diagram of a test device 1 to test a to-be-tested electronic product 2, in accordance with an exemplary embodiment. Before testing, the product 2 is placed in a fixed position in the front of the test device 1.

Figure 2:
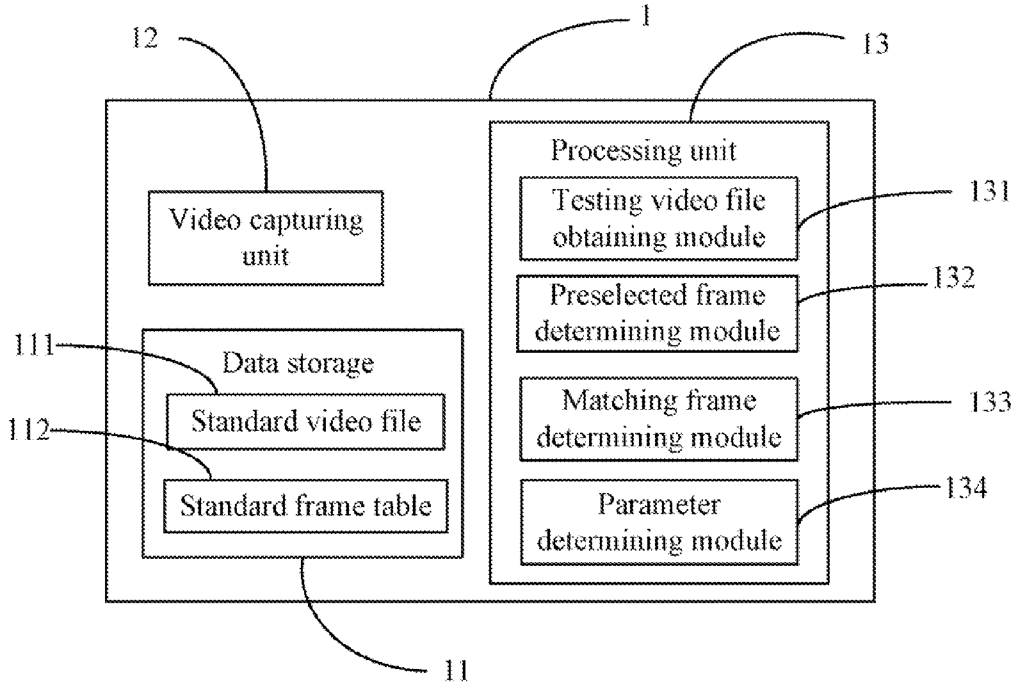
FIG. 2 is a block diagram of the test device of FIG. 1.

FIG. 2 is a block diagram of the test device 1 of FIG. 1. The test device 1 includes a data storage 11, a video capturing unit 12, and a processing unit 13. The data storage 11 stores a standard video file 111 and a standard frame table 112. The standard video file 111 records a series of frames which show a standard electronic product playing a testing file with a number of pages. The standard frame table 112 records a number of standard frames and the display time of each standard frame. The standard frames are selected from the frames of the standard video file 111 and used for determining the display parameters of the product 2.

In this exemplary embodiment, the standard frames include a first standard frame, a second standard frame, a third standard frame, and a fourth standard frame. The first standard frame displays a picture which is captured when the standard electronic product turns on a light (not shown) which is for indicating a play instruction is received from the test device 1, the second standard frame which is a frame first obtained when the first page of the testing file is played, the third standard frame which is a frame lastly obtained when a page of the testing file is played, and the fourth standard frame which is a frame first obtained when another page following the page of the testing file is played. The difference between the display time of the second standard frame and the first standard frame is the display response time of the standard electronic product. The difference between the display time of the fourth standard frame and the third standard frame is the page response time of the standard electronic product. In other embodiment, more standard frames can be set according to need.

The video capturing unit 12 is for capturing pictures generated in the playing process during which the product 2 plays the testing file. The captured pictures of the product 2 are stored to the data storage 11 as an original video file.

The processing unit 13 includes a testing video file obtaining module 131, a preselected frame determining module 132, a matching frame determining module 133, and a parameter determining module 134. The testing video file obtaining module 131 is for controlling the video capturing unit 12 to capture the original video file of the product 2, and comparing the original video file with the standard video file 111 to obtain a testing video file from the original video file. In this exemplary embodiment, the way of obtaining the testing video file from the original video file is: comparing the frames of the original video file with the first frame of the standard video file 111 from the first frame of the original video file until a first matching frame which matches the first frame of the standard video file 111 is found in the original video file, deleting the frames of the video file previous to the first matching frame, comparing the frames of the original video file with the last frame of the standard video file 111 from the last frame of the original video file until a second matching frame which matches the last frame of the standard video file 111 is found in the original video file, deleting the frames of the video file following the second matching frame, thereby the frames between the first matching frame and the second matching frame forms the testing video file. In the exemplary embodiment, the matching of two frames is determined by comparing pixels of two frames. If the difference of the pixel values of the two frames is in a predetermined range, the processing unit 13 determines the two frames are matching, if the difference of the pixel values of the two frames is out of the predetermined range, the processing unit 13 determines the two frames are not matching.

The preselected frame determining module 132 obtains the display time of each standard frame of the standard video file 111 from the standard frame table 112 in turn and obtains frames from the test video file according to the obtained display times. Each of the obtained frames which are generated at the display times correspondingly is taken as a reference frame of each standard frame. The preselected frame determining module 132 further selects K frames previous to each reference frame and K frames following each reference frame from the test video file as preselected frames of each reference frame. The value of K can be set according to need.

The matching frame determining module 133 compares the preselected frames of each reference frame with the standard frame corresponding to each reference frame to determine whether a third matching frame exists in the preselected frames of each reference frame. If the third matching frame does not exist in the preselected frames of each reference frame, the processing unit 13 determines the to-be-tested electronic product 2 has flaws and the test of the product 2 is finished. If the third matching frame exists in the preselected frames of each reference frame, the matching frame determining module 133 records the display time of the third matching frame, and goes on determining whether there are the third matching frames in the preselected frames corresponding to each of the next standard frames in the testing video file.

When the third matching frames corresponding to all the standard frames are found in the testing video file, the parameter determining module 134 determines the display parameters, namely the display response time and the page response time of the product 2, according to the display times of the third matching frames. The display response time of the to-be-tested electronic product 2 is determined by the difference between the display time of the third matching frame which corresponds to the second standard frame and the third matching frame which corresponds to the first standard frame. The page response time is determined by the difference between the display time of the third matching frame which corresponds to the fourth standard frame and the third matching frame which corresponds to the third standard frame.

Figure 3:
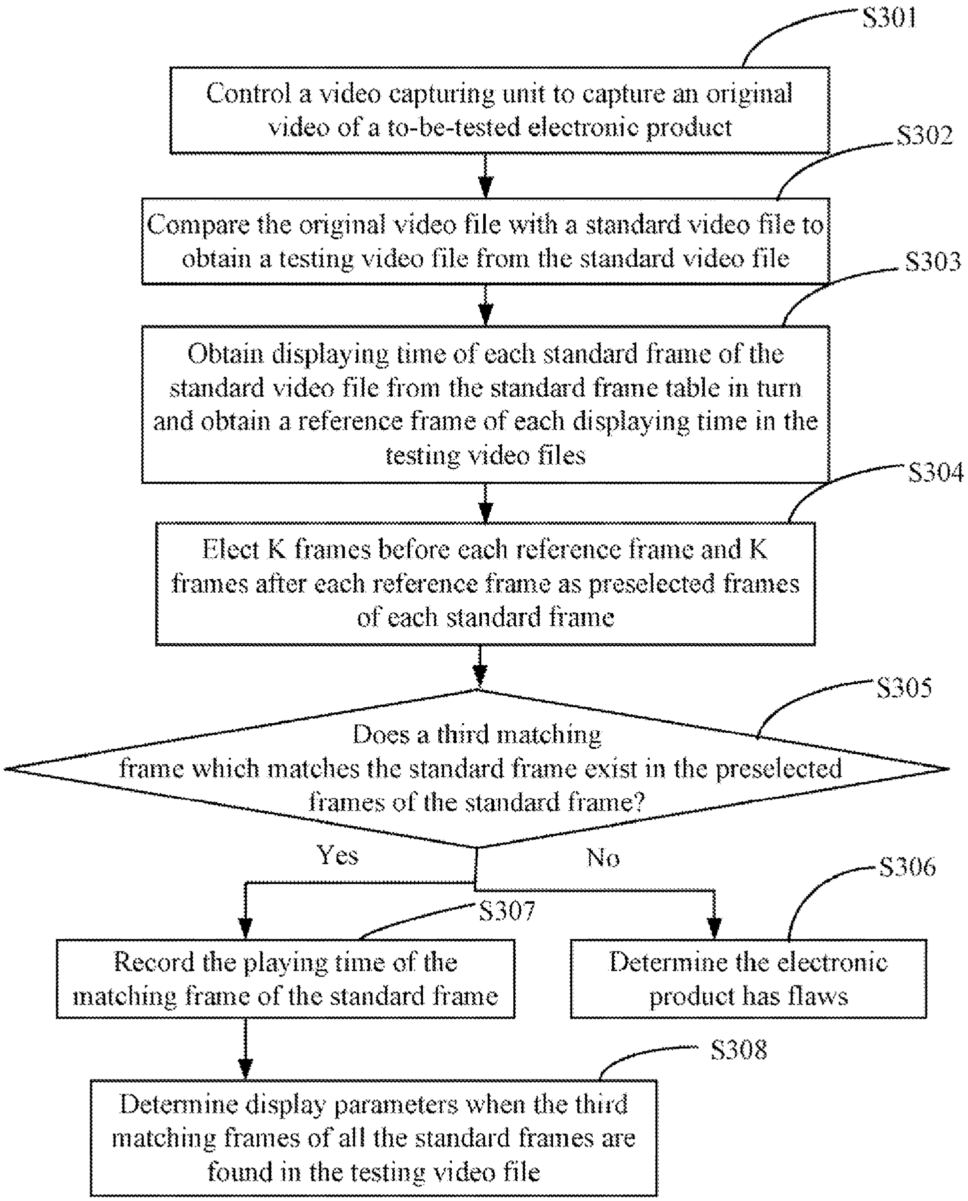
FIG. 3 is a flowchart of a method for testing the to-be-tested electronic product by the test device of FIG. 1.

FIG. 3 is a flowchart of a method for testing the electronic product 2 by the test device 1 of FIG. 1.

In step S301, the testing video file obtaining module 131 controls the video capturing unit 12 to capture the original video of the to-be-tested electronic product 2.

In step S302, the testing video file obtaining module 131 compares the original video file with the standard video file 111 to obtain a testing video file from the test video file.

In step S303, the preselected frame determining module 132 obtains the display time of each standard frame of the standard video file 111 from the standard frame table 112 in turn and obtains a frame of each display time in the test video file as a reference frame of each standard frame.

In step S304, the preselected frame determining module 132 selects K frames previous to each reference frame and K frames following each reference frame as preselected frames of each standard frame.

In step S305, the matching frame determining module 133 compares the preselected frames of each reference frame with the standard frame corresponding to each reference frame to determine whether a third matching frame exists in the preselected frames of each reference frame.

If the third matching frame does not exist in the preselected frames of each reference frame, in step S306, the matching frame determining module 133 determines the product 2 has flaws and the test of the product 2 is finished.

If the third matching frame exists in the preselected frames of each reference frame, in step S307 the matching frame determining module 133 records the display time of the third matching frame, and goes on determining whether there are the third matching frames in the preselected frames corresponding to each of the next standard frames in the testing video file.

When the third matching frames corresponding to all the standard frames are found in the testing video file, in step 307 the parameter determining module 134 determines the display parameters of the product 2, namely the display response time and the page response time, according to the display times of the third matching frames.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A test device for testing an electronic product, comprising:

a data storage for storing a standard video file and a standard frame table, the standard video file comprising a series of frames which show a standard electronic product playing a testing file with a plurality of pages, the standard frame table recording a plurality of standard frames and display time of each standard frame;

a video capturing unit for capturing pictures generated in the playing process during which the electronic product plays the testing file, the captured pictures of the electronic product being stored in the data storage as an original video file, and a processing unit, comprising:

a testing video file obtaining module for controlling the video capturing unit to capture the original video file of the electronic product playing the testing file, and comparing the original video file with the standard video file to obtain a testing video file from the original video file;

a preselected frame determining module for obtaining the display time of each standard frame of the standard video file from the standard frame table in turn and obtaining frames from the test video file according to the obtained display times, taking each of the obtained frames which are generated at the display times correspondingly as a reference frame of each standard frame, selecting K frames previous to each reference frame and K frames following each reference frame from the test video file as preselected frames of each reference frame;

a matching frame determining module for comparing the preselected frames of each reference frame with the standard frame corresponding to each reference frame to determine whether a matching frame exists in the preselected frames of each reference frame, if the matching frame does not exist in the preselected frames of each reference frame, determining the electronic product has flaws and finishing the test of the electronic product, if the matching frame exists in the preselected frames of each reference frame, recording the display time of the matching frame, and determining whether there are the matching frames in the preselected frames corresponding to each of the next standard frames in the testing video file; and a parameter determining module for determining display parameters according to the display times of the matching frames when the matching frames corresponding to all the standard frames are found in the testing video file.

2. The test device as described in claim 1, wherein the way of obtaining the testing video file from the original video file is: comparing the frames of the original video file with the first frame of the standard video file from the first frame of the original video file until a first matching frame which matches the first frame of the standard video file is found in the original video file, deleting the frames of the video file previous to the first matching frame, comparing the frames of the original video file with the last frame of the standard video file from the last frame of the original video file until a second matching frame which matches the last frame of the standard video file is found in the original video file, deleting the frames of the video file following the second matching frame, thereby the frames between the first matching frame and the second matching frame forms the testing video file.

3. The test device as described in claim 2, wherein matching of two frames is determined by comparing pixels of two frames, if the difference of the pixel values of the two frames is in a predetermined range, the processing unit determines the two frames are matching, if the difference of the pixel values of the two frames is out of the predetermined range, the processing unit determines the two frames are not matching.

4. The test device as described in claim 1, wherein when testing the display parameters, the test device sends a play instruction to control the electronic product or the standard electronic product to turn on a light to indicate the play instruction is received and further control the electronic product to play the testing file.

5. The test device as described in claim 4, wherein the display parameters of the electronic product comprise a display response time, the standard frames comprises a first standard frame, a second standard frame, the first standard frame displays a picture which is captured when the standard electronic product turns on the light, the second standard frame which is a frame first obtained when the first page of the testing file is played, the preselected frame determining module and the matching frame determining module determine the matching frame of the first standard frame and the second standard frame respectively, and the parameter determining module determines the display response time by the difference between the display time of the matching frame which corresponds to the second standard frame and the matching frame which corresponds to the first standard frame.

6. The test device as described in claim 1, wherein the display parameters of the electronic product comprise a page response time, the standard frames comprises a third standard frame and a fourth frame, the third standard frame which is a frame lastly obtained when a page of the testing file is played, and the fourth standard frame which is a frame first obtained when another page following the page of the testing file is played, and the parameter determining module determines the page response time by the difference between the display time of the matching frame which corresponds to the fourth standard frame and the matching frame which corresponds to the third standard frame.

7. A method for testing an electronic product by a test device, comprising:

prerecording a standard video file and a standard frame table, the standard video file for recording a series of frames which show a standard electronic product playing a testing file with a plurality of pages, the standard frame table for recording a plurality of standard frames and display time of each standard frame;

controlling a video capturing unit to capture pictures generated in the playing process during which the electronic product plays the testing file, the captured pictures of the electronic product are taken as an original video file;

comparing the original video file with the standard video file to obtain a testing video file from the original video file;

obtaining display time of each standard frame of the standard video file from the standard frame table in turn and obtains frames from the test video file according to the obtained display times;

taking each of the obtained frames which are generated at the display times correspondingly as a reference frame of each standard frame;

selecting K frames previous to each reference frame and K frames following each reference frame from the test video file as preselected frames of each reference frame;

comparing the preselected frames of each reference frame with the standard frame corresponding to each reference frame to determine whether a matching frame exists in the preselected frames of each reference frame;

determining whether there are the matching frames in the preselected frames corresponding to each of the next standard frames in the testing video file;

determining the electronic product has flaws and finishing the test of the product if the electronic product has flaws, if the matching frame does not exist in the preselected frames of each reference frame;

recording the display time of the matching frame if the matching frame exists in the preselected frames of each reference frame; and determining display parameters according to the display times of the matching frames when the matching frames corresponding to all the standard frames are found in the testing video file.

8. The method as described in claim 7, wherein the way of obtaining the testing video file from the original video file is: comparing the frames of the original video file with the first frame of the standard video file from the first frame of the original video file until a first matching frame which matches the first frame of the standard video file is found in the original video file, deleting the frames of the video file previous to the first matching frame, comparing the frames of the original video file with the last frame of the standard video file from the last frame of the original video file until a second matching frame which matches the last frame of the standard video file is found in the original video file, deleting the frames of the video file following the second matching frame, thereby the frames between the first matching frame and the second matching frame forms the testing video file.

9. The method as described in claim 8, wherein matching of two frames is determined by comparing pixels of two frames, if the difference of the pixel values of the two frames is in a predetermined range, the processing unit determines the two frames are matching, if the difference of the pixel values of the two frames is out of the predetermined range, the processing unit determines the two frames are not matching.

10. The method as described in claim 7, wherein when testing the display parameters, the test device sends a play instruction to control the electronic product or the standard electronic product to turn on a light to indicate the play instruction is received and further control the electronic product to play the testing file.

11. The method as described in claim 10, wherein the display parameter of the electronic product comprises a display response time, the standard frames comprises a first standard frame, a second standard frame, the first standard frame displays a picture which is captured when the standard electronic product turns on the light, the second standard frame which is a frame first obtained when the first page of the testing file is played, the display response time is determined by the difference between the display time of the matching frame which corresponds to the second standard frame and the matching frame which corresponds to the first standard frame.

12. The method as described in claim 7, wherein the display parameter of the electronic product comprises a page response time, the standard frames comprises a third standard frame and a fourth frame, the third standard frame which is a frame lastly obtained when a page of the testing file is played, and the fourth standard frame which is a frame first obtained when another page following the page of the testing file is played, the page response time by the difference between the display time of the matching frame which corresponds to the third standard frame and the matching frame which corresponds to the fourth standard frame.

* * * * *